United States Patent [19]

Scharf

[11] 4,186,782
[45] Feb. 5, 1980

[54] PORTABLE ARRANGEMENT FOR AND METHOD OF TRANSFERRING MATERIALS BETWEEN OPEN-MOUTHED CONTAINERS

[76] Inventor: Lou Scharf, 240 Central Park South, New York, N.Y. 10019

[21] Appl. No.: 908,051

[22] Filed: May 22, 1978

[51] Int. Cl.² .............................................. B65B 31/00
[52] U.S. Cl. .......................................... 141/7; 118/19; 137/205; 141/9; 141/59; 141/231
[58] Field of Search .................. 118/19; 128/276–278, 128/297; 137/205; 141/1, 7, 8, 59, 67, 231, 286, 392, 9, 11, 84; 302/59

[56] References Cited

U.S. PATENT DOCUMENTS

| 2,664,911 | 1/1954 | Thompson et al. ................ 137/205 |
| 2,784,748 | 3/1957 | Eichenlaub ......................... 141/59 X |
| 3,381,687 | 5/1968 | Andersen et al. ................. 141/59 X |
| 3,394,677 | 7/1968 | Taylor et al. ....................... 118/19 X |

Primary Examiner—Frederick R. Schmidt
Attorney, Agent, or Firm—Kirschstein, Kirschstein, Ottinger & Cobrin

[57] ABSTRACT

A vacuum pump and motor drive are mounted on one side of a portable disc, and a resilient sealing element is mounted on the other side. The disc is manually pressed into sealing engagement with the mouth of a mixing pan of a tablet coating pan. A suction inlet nozzle at one end of a flexible conduit is inserted into a container in which materials to be coated are located. The other end of the conduit is mounted on and extends through the disc to thereby communicate with the interior of the pan. Actuation of the pump and motor generates a suction force which causes the materials in the container to be loaded into the pan. Insertion of the nozzle into another container in which coating materials are located causes the latter to also be loaded into the pan. When coating is completed, the coated materials are unloaded from the pan to an additional container by moving the disc into sealing engagement with the mouth of the additional container, by inserting the nozzle into the pan, and by re-generating the suction force. A control rheostat adjusts the transfer rate of the materials to be loaded and/or unloaded.

10 Claims, 5 Drawing Figures

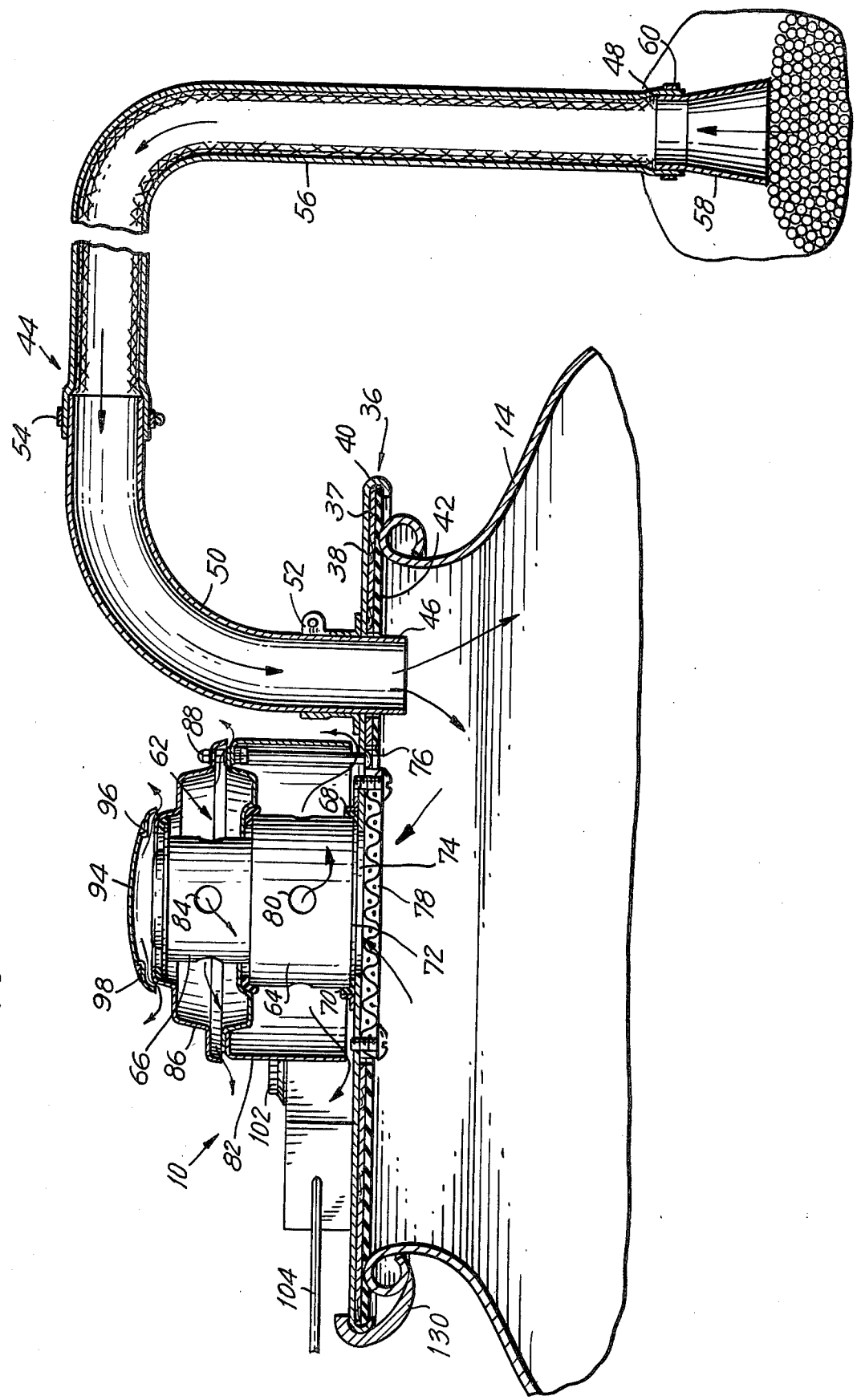

PORTABLE ARRANGEMENT FOR AND METHOD OF TRANSFERRING MATERIALS BETWEEN OPEN-MOUTHED CONTAINERS

BACKGROUND OF THE INVENTION

1. Field of the Invention

The present invention generally relates to an arrangement for and method of transferring materials between open-mouthed containers and, more particularly, to a portable arrangement for and method of loading materials to be coated and coating materials into a mixing pan of a tablet coating pan, and unloading the coated materials from the pan.

2. Description of the Prior Art

Tablet coating pans are well known for making coated candy such as jelly beans and for making coated pharmaceuticals such as time-delayed disintegration tablets. Such pans are used by initially putting in the materials to be coated and then by putting in the coating material. The mixing pan turns around at a rather slow speed for a rather long period of time, usually several hours. The coating material adheres to the materials to be coated. The final coating is a smooth, continuous, uniform layer adhered to the material coated.

A drawback associated with this type of coating pan is in the way the materials are loaded into it and in the way the coated materials are unloaded from it. As long as these pans have been used, the materials have been loaded into the pan by dumping it out of buckets. The coated materials have been taken out of the pan by scooping it out. This is a slow, costly and laborious procedure.

Another drawback associated with such pans is that a good deal of dust is raised during the loading and unloading steps. This is particularly disadvantageous in connection with pharmaceutical products because of cross-contamination between different products in the room where the coating is being effected. Sometimes, there can be fifty coating pans in a single room, each coating a different product. In the general field of loading materials, it is known to utilize non-portable and complex vacuum-generating arrangements to fill containers such as bottles or tank cars, with a liquid. Such cumbersome vacuum-generating arrangements are generally satisfactory for their intended use; however, they are too bulky and heavy to be used to load and/or unload pan after pan in a room installation wherein a plurality of coating pans are located.

SUMMARY OF THE INVENTION

Objects of the Invention

Accordingly, it is the general object of the present invention to covercome the aforementioned drawbacks of the prior art.

Another object of the present invention is to simplify the loading and/or unloading of pan after pan.

An additional object of the present invention is to eliminate dust and prevent cross-contamination between pans, particularly upon removal of the coated materials.

Still another object of the present invention is to provide a material transfer arrangement which is relatively inexpensive, light-in-weight, versatile and efficient.

A further object of the present invention is to provide a material transfer arrangement which is fully portable and can be used for both loading and/or unloading purposes.

Yet another object of the present invention is to provide a material transfer arrangement which is capable of being used with containers of various shapes and sizes.

Features of the Invention

In keeping with these objects and others which will become apparent hereinafter, one feature of the invention resides, briefly stated, in a portable arrangement for transferring materials between open-mouthed containers. The arrangement comprises portable cover means operative for removably sealingly engaging the respective mouths of at least two containers. The cover means includes a portable frame and a sealing member mounted on the same for movement together with the frame between a loading position in which the sealing member covers and sealingly engages the mouth of one of the containers while leaving another of the containers uncovered, and an unloading position in which the sealing member covers and sealingly engages the mouth of the other container while leaving the one container uncovered.

The portable arrangement also comprises an elongated conduit operative for communicating between the respective interiors of the covered and the uncovered containers. The conduit has one end region mounted on the frame for movement together with the latter and communicating with the interior of the respectively covered container, and another end region in communication with and movable relative to said one end region of the conduit for entry through the mouth of the respectively uncovered container into the interior of the latter.

The arrangement still further comprises means for moving material from the interior of the uncovered container to the interior of the covered container in each position of the cover means. The material-moving means includes a vacuum pump and a motor drive both mounted on the frame for movement together with the latter and operative in each position of the cover means for generating within the respectively covered container a pressure which is lower than the pressure within the respectively uncovered container. The pressure differential generated by the vacuum pump is operative for loading material from the other container through the conduit to the one container in the loading position and for unloading material from the one container through the conduit to the other container in the unloading position.

In accordance with the method of the present invention, the steps include mounting a cover in removable sealing engagement with the mouth of one of the containers while leaving another of the containers uncovered; mounting one end region of an elongated conduit on the cover for movement with the same, said one end region communicating with the interior of the one container; inserting another end region of the elongated conduit into the interior of the other uncovered container; loading materials from the other uncovered container through the conduit to the one container by generating within the latter a pressure which is lower than the pressure existing within the other uncovered container; subsequently mounting the cover in sealing engagement with the mouth of the other container to thereby communicate said one end region of the conduit with the interior of the other covered container, while leaving the one container uncovered; inserting said other end region of the conduit into the interior of the one uncovered container; and unloading materials from the one uncovered container through the conduit to the other covered container by regenerating within the latter said lower pressure within the other covered container.

The above-described portable arrangement and method achieves the aforementioned objects in a novel manner. The mounting of the sealing member, said one end region of the conduit means, the pump and the motor all on the frame for movement with the latter assures full portability and versatility. Pan after pan can be reliably loaded and/or unloaded. By configurating the sealing member as a planar, sheet-like resilient element, the portable arrangement is capable of being used to seal containers of various shapes and sizes. The sealing member also assures that cross-contamination by dust particles is effectively avoided during both loading and/or unloading.

In accordance with yet another feature of the present invention, a rheostat is provided on the portable frame and is operative for adjusting the transfer rate of the materials to be transferred during either loading and/or unloading.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a partially broken-away, sectional view taken on line 3—3 of FIG. 2;

DESCRIPTION OF THE PREFERRED EMBODIMENTS

Figure 1:
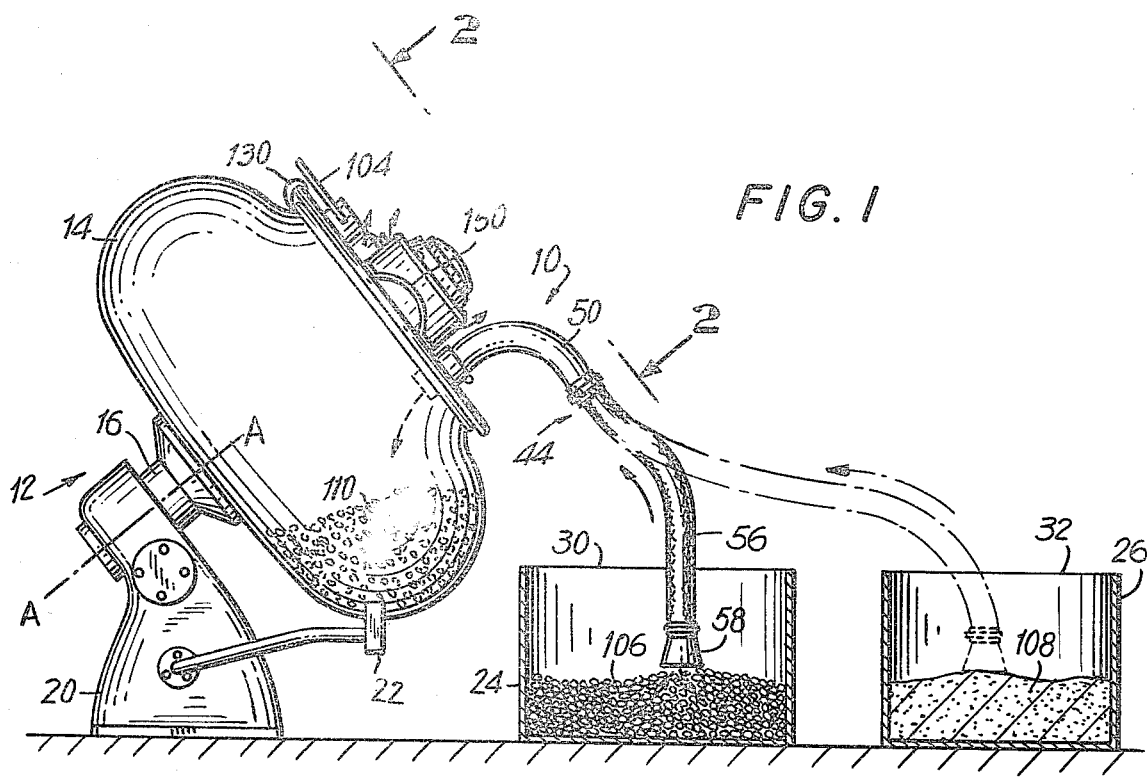
FIG. 1 is a partially-sectioned, partially-diagrammatic elevational view of the portable arrangement for and method of transferring materials between open-mouthed containers during loading in accordance with a preferred mode of application for the present invention.
Figure 4:
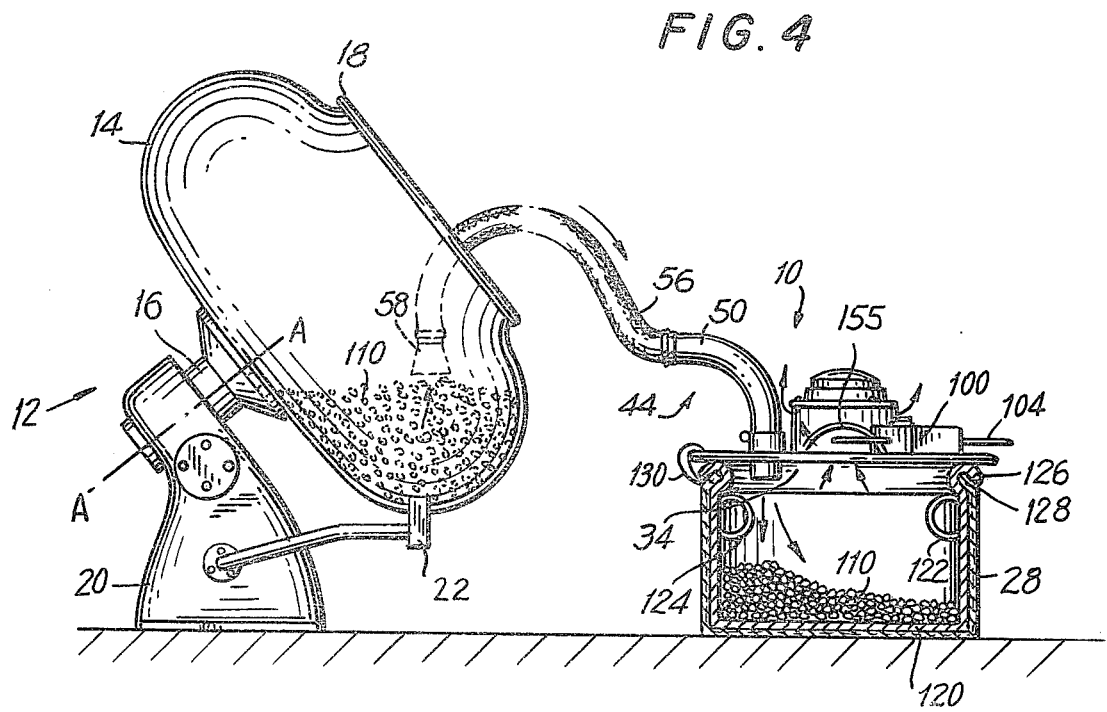
FIG. 4 is a partially-sectioned, elevational view of the portable arrangement for and method of transferring materials between open-mouthed containers during unloading in accordance with the preferred mode of FIG. 1.

Referring now to the drawings, reference numeral 10 generally identifies a portable arrangement for transferring materials between open-mouthed containers in accordance with the method of the present invention. FIG. 1 shows the portable arrangement 10 in the loading operative position; FIG. 4 shows the portable arrangement 10 in the unloading operative position.

In accordance with a preferred mode of application, the container to be loaded and/or unloaded is a tablet coating pan sometimes simply known as a revolving pan. One such revolving pan is generally identified by reference numeral 12 and comprises a rather large pan 14 of approximately 60 inch diameter which is mounted on drive motor shaft 16 for turning movement about axis A—A. The pan 14 has an access opening or a constricted mouth 18 of approximately 30 inch diameter. The shaft 16 is journalled on base 20, and is driven by a non-illustrated motor located within base 20. Gear box 22 for controlling the operation of the motor is also mounted on the base 20.

Such revolving pans are conventionally used by pharmaceutical and candy manufacturers and are operative to rotate the mixing pan 14 about axis A—A at a relatively slow rate of rotation, typically at fixed speeds on the order of 16 rpm or at variable speeds of about 10–30 rpm. In use, the materials to be coated are initially placed within the mixing pan. Then, a coating material is placed within the pan. Next, the pan 14 is rotated at the aforementioned rather slow speed for a rather long period of time, usually several hours. The coating material eventually sticks to the materials to be coated. In the candy manufacturing field, a jelly bean is a good example of the finished coated product. In the pharmaceutical field, this type of revolving pan has been used for making coated pharmaceuticals such as time-delayed disintegration tablets commonly used for cold remedies. The final coating is a smooth, continuous, uniform layer adhered to the material to be coated.

For ease of description, the present invention will be described in connection with the manufacture of uniformly coated products. However, it will be expressly understood that the portable arrangement and method of the present invention are not to be limited to the transfer of materials to be coated and/or coating materials and/or coated materials to and from a coating pan. The present invention can in fact be utilized with the transfer of one or more of any type of material relative to one or more of any type of open-mouthed container. In the following description, reference numerals 24, 26 and 28 generally identify containers having access openings or mouths 30, 32 and 34, respectively.

Turning now to FIG. 3, the portable arrangement 10 comprises portable cover means 36 which includes a generally circular metallic support disc or frame 38. A stiffening downturned generally annular lip or rim 40 is turned down from the border of disc 38 to reinforce the disc. A wood reinforcement plate 37 is adhered to the lower side of disc 38 for strengthening the same. The lower side of the plate 37 carries a generally planar and circular resilient disc 42 of a foamed resilient polyurethane material. The disc 42 may be constituted by any resilient material which is flexible enough to form a good air-tight seal with the mouth of pan 14 when the resilient disc 42 is mounted in engagement with the pan mouth 18. The circular support disc 38, the wood plate 37 and the circular resilient disc 42 all have a larger diameter than the diameter of the pan mouth 18, that is they completely cover the pan mouth. It will be noted that the generally flat and sheet-like configuration of the resilient disc 42 insures that differently-sized container mouths can be accommodated easily. As will be described more fully below, the resilient disc 42 can not only accommodate pan mouth 18 and sealingly engage the same in air-tight engagement, but also the relatively smaller mouth 30 of container 24, the still smaller mouth 32 of container 26, and the mouth 34 of container 28.

The portable arrangement 10 further comprises elongated conduit means 44 for communicating between the interiors of at least two different containers. The conduit 44 includes a non-flexible, preferably metallic, 90° curved pipe section 50 which has one pipe end region 46 mounted on the cover means 36 for movement together with the latter. Pipe end region 46 is detachably and fixedly mounted on disc 38 at mounting flange 52, and extends through a pair of juxtaposed holes formed in the discs 38, 42 to thereby communicate with the interior of pan 14. The opposite end region of pipe section 50 is connected by clamp 54 to an end region of a flexible pipe section 56. A generally conically-shaped inlet nozzle 58 is connected by clamp 60 to flexible pipe end region 48. The flexibility and bendability of pipe section 56 allows the latter to conveniently span the distance between a pair of containers. FIG. 1 diagrammatically shows how pipe section 56 can be manually moved and bent from the solid line position in which nozzle 58 is located in the interior of container 24, to the dashed line position in which nozzle 58 is located in the interior of container 26. Of course, the clamp 54 need not be located in the illustrated position, but can be located at any region along the length of the conduit means 44, preferably adjacent clamp 52.

The nozzle 58, pipe section 56, and pipe section 50 together define a path for materials to be advanced therealong in direction of the illustrated arrows. In order to effectuate such movement of materials between the respective interiors of a pair of containers, material-moving means 62 are fixedly mounted on the support disc 38 for movement together with the latter. The material-moving means 62 includes a suction generating device or vacuum pump 64 and an electrically-operated motor 66 for driving the pump 64. Support disc 38 has an annular seat 68 mounted thereon in which a vibration-damping element 70 is lodged. Pump 64 is seated in an annular recess formed in damping element 70 which is preferably constituted by an elastomeric material. Pump 64 has a suction inlet or opening 72 at its lower end which faces and is aligned with opening 74 formed in support disc 38. Opening 74 faces and is aligned with opening 76 which is formed in resilient disc 42. Openings 72, 74 and 76 are all juxtaposed with each other, and stainless wire mesh screen 78 is received with clearance in opening 76. Screen 78 has a slightly larger diameter than opening 72, and is mounted directly below and in sealing engagement with the underside of support disc 38. Screen 78 has a multitude of pores through which air from the interior of pan 14 can pass past opening 74 to suction inlet opening 72.

Electric motor 66 has a non-illustrated drive shaft which turns the rotor of pump 64 to thereby generate a pressure at suction inlet opening 72 which is lower than the pressure of the ambient atmosphere. This pressure differential causes a flow of air in direction of the illustrated arrows through the pump 64. A portion of the filtered air which enters the pump from the pan passes through exhaust ports 80 and thereupon out through an annular clearance bounded by the upper side of disc 38 and the lower side of generally cylindrical lower housing portion 82. Another portion of the filtered air which enters the pump from the pan is conducted over the motor to cool the same. This last-mentioned air portion is thereupon discharged through additional exhaust ports 84 and thereupon out through an annular clearance bounded by the upper side of lower housing portion 82 and the lower side of upper housing portion 86.

A plurality of fastener bolts 88, 90, 92 are equi-angularly spaced in circumferential direction about the center of circular support disc 38; and these bolts pass through and connect upper housing portion 86, lower housing portion 82, support disc 38, resilient disc 42 and screen 78 in mutually interconnected relationship. A cap baffle 94 is connected by a plurality of equi-angularly spaced fasteners 96, 97, 98, 99 to upper housing portion 86 and defines a clearance for air flow out from the upper housing portion 86. The baffle 94 disperses the air flow in radially outward directions.

Figure 2:
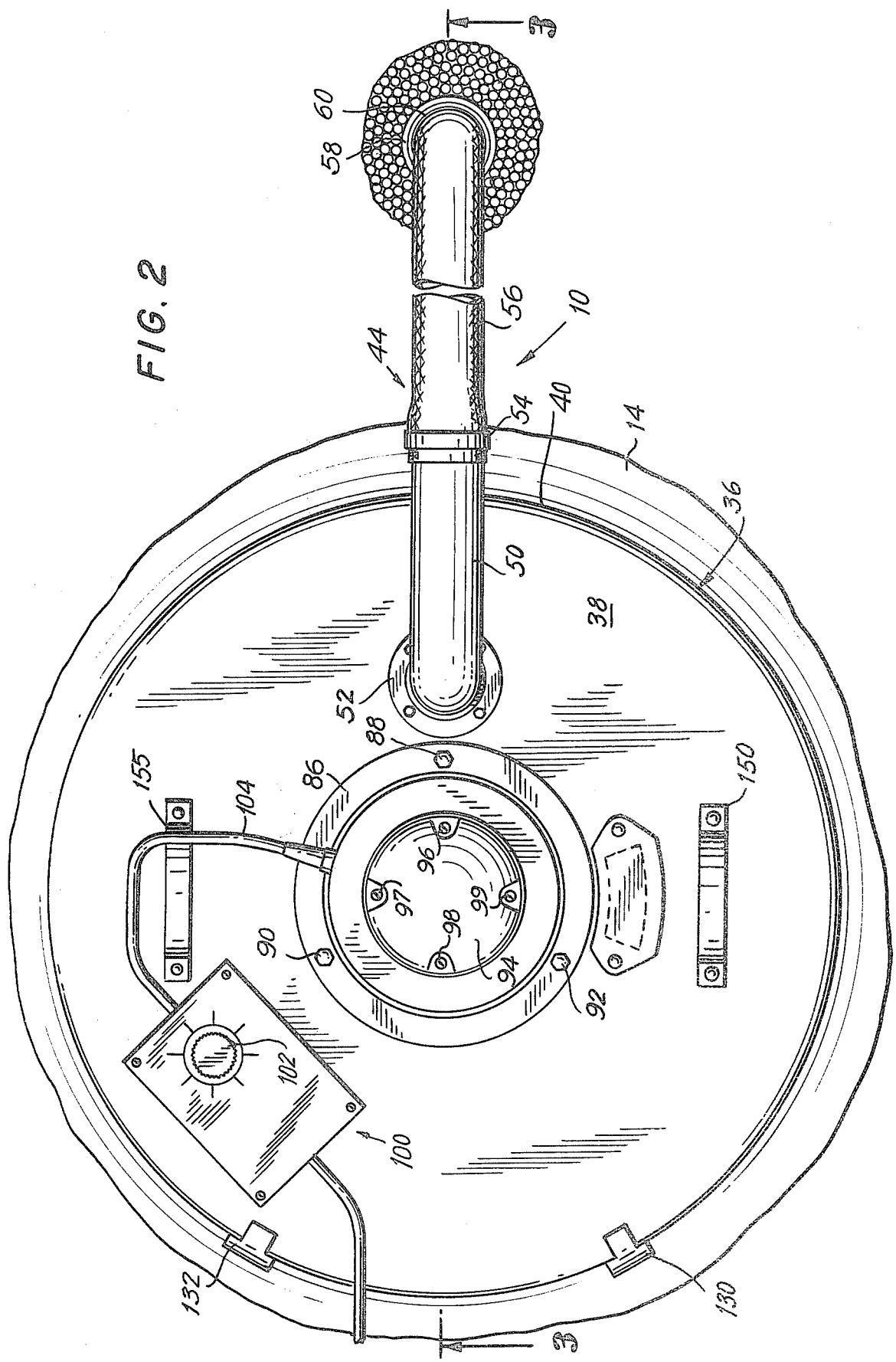
FIG. 2 is a partially broken-away, sectional view taken on line 2—2 of FIG. 1.

As best shown in FIG. 2, a rheostat 100 having a control knob 102 is mounted on support disc 38. Rheostat 100 is connected by electrical cable 104 to the electrical power input of motor 66 and, upon turning the knob 102 which is operatively connected to the wiper arm of the rheostat, the rheostat is operative for controlling the rotary speed of the shaft which drives the vacuum pump 64 and, therefore, the magnitude of the suction force generated by the pump. Put another way, the transfer rate of the material to be transferred is adjusted by operation of the rheostat.

In use, let us initially assume that pan 14 is empty and that it is desired to load the particulate solid material in container 24 into pan 14. Now, with respect to FIG. 1, a user grabs the portable disc 38 and manually places the latter over the pan mouth 18 with a force sufficient to press the resilient disc 42 firmly against the rim of the mouth 18 so as to form a relatively good air-tight seal therewith. Retaining claws or clamps 130, 132 which are connected to the upper side of the support disc 38 extend downwardly from the latter and engage the rim of the mouth of the pan 14. The clamps are operative to retain the portable arrangement on the pan mouth at all times, and particularly when no suction is generated in the pan. The nozzle 58 is then inserted through the mouth 30 into the interior of container 24 over the particulate solid material 106 to be coated. The motor 66 is then turned on. The air pump 64 develops a sub-atmospheric, negative pressure which causes the material 106 at atmospheric pressure to be sucked up and to enter the nozzle 58 for transfer through the pipe sections 56, 50 and thereupon into the interior of pan 14.

Let us further assume that it is desired to load the aqueous coating material 108 in container 26 into pan 14. A user merely withdraws the nozzle 58 from container 24 and inserts the nozzle through mouth 32 into the interior of container 26. Energization of the motor will cause the aqueous coating 108 to enter the nozzle 58 and pass through the conduit means 44 prior to discharge into the pan. The rheostat 100 can be adjusted, as described above, to adjust the loading rate of the material 106 to be coated and/or the coating material 108.

Once the material-entrained air streams enter the pan, the materials 106, 108 descend under the influence of gravity to the pan bottom, and the air is sucked out through and filtered by the mesh screen 78. The screen 78 effectively filters out the smaller-sized material particles and prevents dust contaminants from contaminating the pump and/or the motor. The screen 78 also cooperates with the resilient sealing disc 42 and together prevent dust contaminants from entering the external ambient atmosphere in the room and cross-contaminating materials contained in other coating pans in the room.

After the pan 14 is filled to the extent desired, the revolving pan motor is actuated to slowly mix the coating material together with the materials to be coated. After the coating operation has been performed, the finished coated materials 110 are required to be unloaded from the pan. A user grabs the portable disc 38 and manually removes the latter from the loading position shown in FIG. 1 in which resilient disc 42 sealingly engages and covers the pan mouth 18, and moves the resilient disc 42 to the unloading position shown in FIG. 4 in which resilient disc 42 sealingly engages and covers the mouth 34 of empty container 28. Container 28 may be container 24 or container 26 upon emptying of the latter containers or, as illustrated, a new container constituted by light-weight paper fibreboard. Such fibreboard containers are conventional shipping containers and are generally satisfactory for their intended use. However, it has been found that when the pump and motor are operative to generate a suction force within such a paperboard container, the cylindrical side wall tends to collapse inwardly. In order to overcome such wall buckling, a shape-retaining, preferably stainless steel, liner 120 is inserted into the interior of container 28. Insertion and withdrawal of the steel liner 120 is facilitated by provision of handles 122, 124 on the interior circumferential wall of the liner and at opposite sides thereof. The upper portion of the liner has an annular lip 126 which overlaps a constricted neck portion 128 of the paperboard container. The resilient disc 42 rests in sealing engagement with this lip 126.

The nozzle 58 is now inserted through mouth 18 and into the interior of pan 14 over the coated material 110. Upon reactivation of the motor and pump, the aforementioned suction force is regenerated, and the coated materials 110 are sucked up through nozzle 58 and through pipe sections 56, 50 for discharge into container 28. Again, rheostat 100 can be adjusted to control the unloading rate. Likewise, any dust raised by the transfer process is presented from entering the motor and the pump by screen 78 and from reaching the external atmosphere by the resilient disc 42.

The above-described portable arrangement 10 is extremely light-weight and versatile. Loading and unloading of pan after pan are made much easier with concomitant avoidance of cross-contamination by eliminating dust, particularly upon removal of the coated materials. Of course, the material to be transferred may be gaseous, solid particulate such as peanuts, raisins, jelly bean centers, or products similar to M&M confectionaries, liquid or any combination thereof such as sugar syrup and liquid chocolate. Stainless steel grip handles 150, 155 are located on the upper side of support disc and provide convenient hand grips for a user to mount and demount the portable arrangement relative to the pan and/or the various containers.

Figure 5:
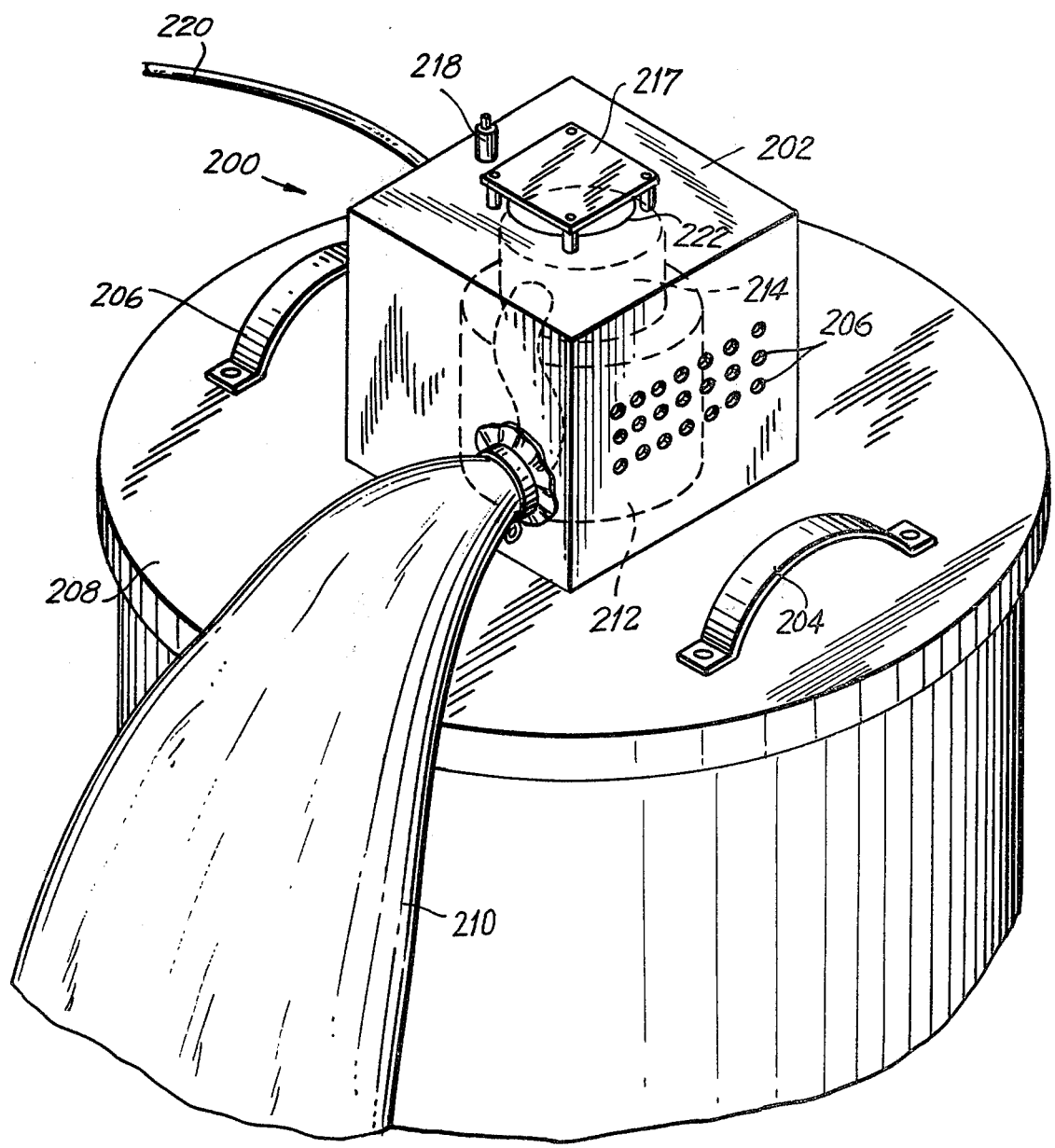
FIG. 5 is a partially broken-away, perspective view of a modified portable arrangement in accordance with the method of the present invention.

As for the modified embodiment of FIG. 5, the portable arrangement 200 comprises a support disc 208 on which strap handles 204 and 206 are mounted for moving the disc 208 between the FIG. 1 and FIG. 4 positions. The housing 202 is parallelopiped in configuration and replaces the two-part housing of FIG. 3. The vacuum pump 212 is mounted on the disc 208 within the housing 202, and the motor 214 is mounted above the pump.

As in the earlier-described embodiment, filtered air enters the pump and one portion of this air is exhausted through exhaust holes 216. Another portion of this air is conducted to the motor to cool the same, and the air exhausted from the motor is discharged through outlet port 222 and through pipe 224. The air discharged from port 222 is dispersed in radially outward direction by baffle plate 217 which is raised above the top wall of housing 202 by a plurality of posts. The air conducted through pipe 224 is supplied to a dust bag 210, wherein any dust particles not previously filtered are entrapped.

A control knob 218 of a rheostat is likewise mounted on the top wall of the housing. This knob controls the amount of current being conducted along electrical cable 220 to the motor 214.

It will be understood that each of the elements described above, or two or more together, may also find a useful application in other types of constructions differing from the types described above.

While the invention has been illustrated and described as embodied in a portable arrangement for and method of transferring materials between open-mouthed containers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A portable arrangement for reversibly transferring materials in either direction between open-mouthed containers, at least one of said containers being a mixing drum for receiving solid materials to be coated and coating materials, comprising:
   (a) portable cover means for removably sealingly engaging the respective mouths of at least two containers, said cover means including
      (i) a portable frame having an access opening, and
      (ii) a sealing member mounted on said frame for movement together with the latter between a loading position in which said sealing member covers and sealingly engages the mouth of one of said containers while leaving another of said containers uncovered, and an unloading position in which said sealing member covers and sealingly engages the mouth of said other container while leaving said one container uncovered;
   (b) elongated conduit means for communicating between the respective interiors of said covered and said uncovered containers, said conduit means having
      (i) one end region mounted on said frame for movement together with the latter and communicating with the interior of the respectively covered container, and
      (ii) another end region in communication with and movable relative to said one end region of said conduit means for entry through the mouth of the respectively uncovered container into the interior of the latter;
   (c) means for moving material from the interior of said uncovered container to the interior of said covered container in each position of said cover means, said material-moving means including
      (i) suction transfer means mounted on said frame for movement together with the latter and operative in each position of said cover means for generating within the respectively covered container a pressure which is lower than the pressure within the respectively uncovered container, said pressure differential being operative for loading material from said other container through said conduit means to said one container in said loading position, and for unloading material from said one container through said conduit means to said other container in said unloading position, (ii) said suction transfer means including a vacuum pump having a suction inlet opening in communication with said access opening of the frame, an electrical motor drive for the pump, and adjusting means electrically connected to said motor for adjusting the transfer rate of the materials to be transferred during loading and unloading by electrically controlling said motor drive;

(d) filtering means at said access opening for preventing entrance of undesired contaminants through said openings to said vacuum pump in each position of said portable cover means; and (e) handle grip means mounted on said frame for reversing the orientation of said suction transfer means and said other end region of said conduit means relative to the covered and uncovered containers in each of said positions, whereby materials are transferred in either direction between the two containers.

2. The portable material transfer arrangement of claim 1, wherein said frame includes a support disc having an annular border region, and means at said border region for stiffening said disc.

3. The portable material transfer arrangement of claim 1, wherein said containers have differently-sized mouth openings, and wherein said sealing member is an annular disc of resilient material, said disc having one side mounted on said frame and an opposite side having a surface area of size large enough to sealingly engage and accommodate the size of each of said differently-sized mouth openings.

4. The portable material transfer arrangement of claim 1, wherein said conduit means includes a non-flexible pipe section and a flexible pipe section connected to and being in internal communication with the latter, said non-flexible pipe section extending through both said frame and said sealing member and terminating in said one end region of said conduit means, said flexible pipe section extending away from said non-flexible pipe section and terminating in said other end region of said conduit means.

5. The portable material transfer arrangement of claim 1, wherein said conduit means further includes a generally conically-shaped inlet nozzle at said other end region of said conduit means.

6. The portable material transfer arrangement of claim 1, wherein said other container contains solid materials to be coated; and further comprising an additional container for containing an aqueous coating material; and wherein said one container is a mixing drum adapted to receive both said solid and said aqueous materials; and further comprising mixing means for coating said solid materials with said aqueous material prior to unloading the resulting coated materials from said drum.

7. A method of transferring materials in either direction between open-mouthed containers, comprising the steps of:

(a) mounting a cover in removable sealing engagement with the mouth of one of said containers while leaving another of said containers uncovered;

(b) mounting one end region of an elongated conduit means on the cover for movement with the same, said one end region communicating with the interior of said one container;

(c) inserting another end region of the elongated conduit means into the interior of said other uncovered container;

(d) loading materials from said other uncovered container through said conduit means to said one container by generating within the latter a pressure which is lower than the pressure existing within said other uncovered container;

(e) subsequently mounting the cover in sealing engagement with the mouth of said other container to thereby communicate said one end region of said conduit means with the interior of said other covered container, while leaving said one container uncovered;

(f) inserting said other end region of the elongated conduit means into the interior of said one uncovered container; and (g) unloading materials from said one uncovered container through said conduit means to said other covered container by re-generating within the latter said lower pressure within said other covered container;

(h) providing an aqueous coating material in an additional container; and wherein said loading step includes loading solid materials to be coated from said other uncovered container and loading the aqueous coating material from said additional container; and further comprising the step of mixing in said one container said aqueous material with said solid materials to thereby coat the latter with said aqueous material prior to unloading the resulting coated materials from said one container.

8. The method of claim 7, wherein said steps of inserting said other end region of said conduit means include the step of providing a flexible conduit and bending the latter to span the distance between said containers.

9. The method of claim 7; and further comprising the step of electrically adjusting the transfer rate of the material to be transferred during the loading step and the unloading step.

10. The method of claim 7; and further comprising the step of providing hand grips on the cover for facilitating movement of the latter into engagement with the respective mouths of the containers; and the step of filtering out undesired contaminants during the loading and unloading steps.

* * * * *